United States Patent

Bae

Patent Number: 5,563,747
Date of Patent: Oct. 8, 1996

[54] METHOD FOR CORRECTING THE COUNTER DISTORTIONS IN VCR

[75] Inventor: Tae S. Bae, Suweon, Rep. of Korea

[73] Assignee: Samsung Electronics Co., Ltd., Kyungki-do, Rep. of Korea

[21] Appl. No.: 919,239

[22] Filed: Jul. 27, 1992

[30] Foreign Application Priority Data

Jul. 26, 1991 [KR] Rep. of Korea .................. 91-13046

[51] Int. Cl.$^6$ ................................. G11B 15/48
[52] U.S. Cl. ........................ 360/74.2; 360/72.3
[58] Field of Search .................. 360/72.3, 74.2, 360/71, 95

[56] References Cited

U.S. PATENT DOCUMENTS 4,963,999  10/1990  Utsunomiya et al. ............... 360/72.3

FOREIGN PATENT DOCUMENTS 58-153246  9/1983  Japan .................. 360/72.3
61-144746  7/1986  Japan .................. 360/74.2
2-33764    2/1990  Japan .................. 360/74.2

OTHER PUBLICATIONS

English Translation of JP#2–33764, See Citation of Paper 7.

*Primary Examiner*—Aristotle Psitos
*Assistant Examiner*—James T. Wilson
*Attorney, Agent, or Firm*—Sughrue, Mion, Zinn, Macpeak & Seas

[57] ABSTRACT

A method for correcting the counter distortions in a VCR for compensating the distortion due to the difference between winding and unwinding amounts of tape when power is turned off and then turned on. During the time from the start of power turning-off to the end of power turning-off, and during the time from the start of power turning-on and to the end of power turning-on, the counting of control pulses is stopped and, instead, reel pulses are counted. Then, the tape is to run forward as much as the reel pulse count value of the power turning-off period out of the reel pulse count value of the power turning-on period, so that there should not occur any distortions during power turning-off and power turning-on.

13 Claims, 4 Drawing Sheets

METHOD FOR CORRECTING THE COUNTER DISTORTIONS IN VCR

FIELD OF THE INVENTION

The present invention relates to a method for correcting the counter distortions in a Video Cassette Recorder (VCR) in which distortions of the counter value are corrected by counting reel pulses during power turn-on and turn-off.

BACKGROUND OF THE INVENTION

In a conventional VCR, control pulses recorded on the video tape are counted by a counter unit of the VCR, and the number counted is converted into time, which is then displayed. If the running direction of the tape is forward, the displayed time is incremented, while if the tape is running in reverse, the displayed time is decremented to determine the counted value.

When a tape is inserted into the VCR, the initial value of the counter is set to 0 hours, 00 minute, 00 second, and thereafter, whenever 30 control pulses are input into a microcomputer, the time is incremented or decremented by 1 second, depending on whether the tape is running forward or backward.

However, since an A/C head for detecting control pulses is positioned between the drum of the deck and the tape, the A/C head is separated during and after the turning-off of the VCR.

Consequently, when the A/C head is separated from the tape during the power turn-on or off operations (hereinafter referred to simply as power turn off or power turn on), neither compensation nor detection for the running direction of the tape is carried out, with the result that there occurs a difference between the winding amount during power turn-off and the unwinding amount during power turn-on, thereby altering the position of the tape. Moreover, during the time power is turned on after turning if off, the control pulses are not detected, and in view of the difference between the winding and unwinding amounts of the tape, there is distortion of the counted value.

SUMMARY OF THE INVENTION

The object of the present invention is to provide a method for correcting the counter distortions in a VCR in which: the detection of control pulses halts during the time from the start of turning-off to the end of turning-off, and during the time from the start of turning-on to the end of turning-on; reel pulses, which are detectable all the time, are detected instead of control pulses; the direction of the tape is forward during power turning-on and the tape runs for a number of the reel pulses corresponding to the number of reel pulses detected during the turning-off of the tape so that the positional distortion of the tape will be eliminated; and thereafter, the counted value is varied in accordance with the number of control pulses.

In achieving the above object, the method for correcting the counter distortions in a VCR according to the present invention, in which control pulses are counted to form a counted value, includes: discriminating between power turning-on and power turning-off operation; reversely driving a loading motor and a capstan motor during power turning-off, and counting reel pulses after halting the counting of control pulses until the completion of power turning-off; stopping the revolution of the loading motor after counting reel pulses, and after a predetermined time, stopping the revolution of the capstan motor; forward driving the loading and capstan motors during power turning-on, halting the counting of control pulses, and counting reel pulses; and forward driving the capstan motor as much as the reel pulse count value of the power turning-off period less the reel pulse count value of the power turning-on period, and resuming the counting of control pulses after stopping the revolution of the loading motor.

BRIEF DESCRIPTION OF THE DRAWINGS

The above object and other advantages of the present invention will become more apparent with reference to the accompanying drawings in which:

FIG. 1 is a timing chart showing the operation of a conventional circuit wherein

FIG. 4 is a timing chart showing the operation of a method according to the present invention wherein

DESCRIPTION OF THE PREFERRED EMBODIMENT

Figure 2:
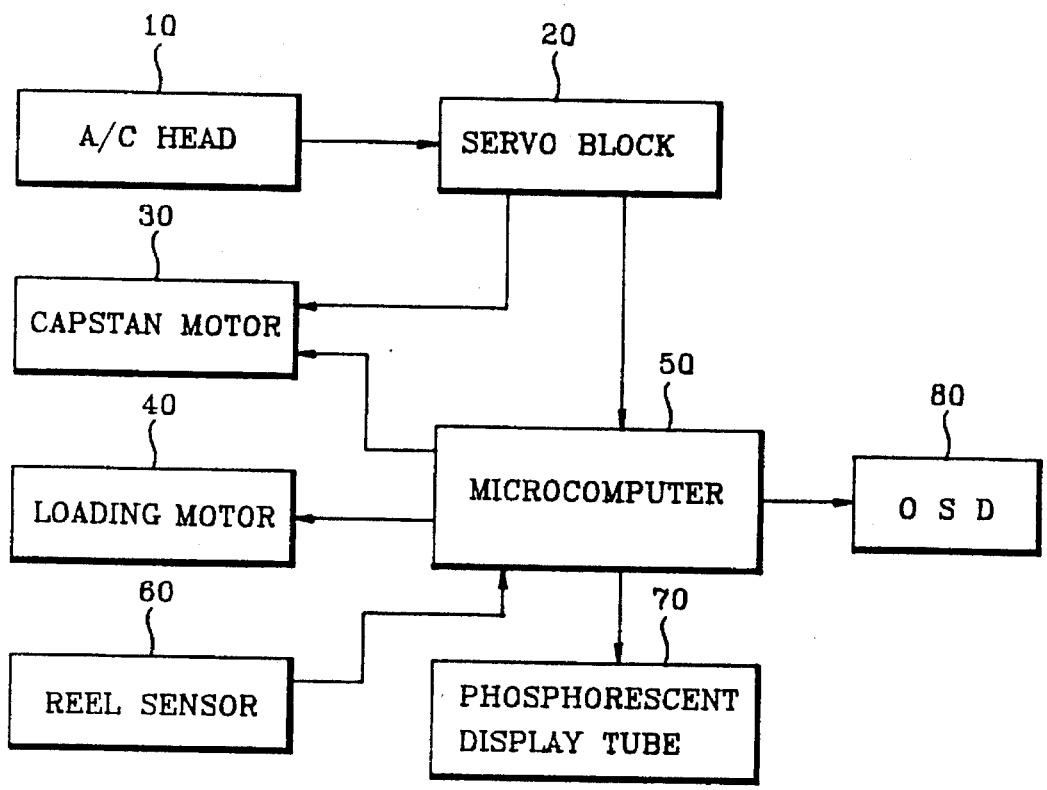
FIG. 2 illustrates a circuit according to the present invention.

FIG. 2 illustrates a circuit of a VCR to which the method of the present invention is applied.

An A/C head 10 detects audio and control signals from a tape, and supplies control pulses to a servo block 20. The control pulses, which serve as reference signals during tape readout, are recorded at the rate of 30 per second for recordings using the NTSC method, and at the rate of 25 per second for recordings using the PAL method.

After receipt of the control pulses, the servo block 20 controls the driving of a capstan motor 30 for running the tape, and supplies control pulses to a microcomputer 50 after converting control pulses to a predetermined waveform.

The microcomputer 50 controls a loading motor 40, which is for shifting the mechanical position of the deck in accordance with the operating mode, and also receives pulses from a reel sensor 60, which detects revolutions of the take up reel. The take-up reel generates a fixed number of pulses, approximately 5–8, per revolution.

Further, the microcomputer 50 displays the operation state of the cassette and the counted value through a phosphorescent display tube 70, and also displays them on the screen of the video monitor (not shown) through an OSD part 80.

Figure 3:
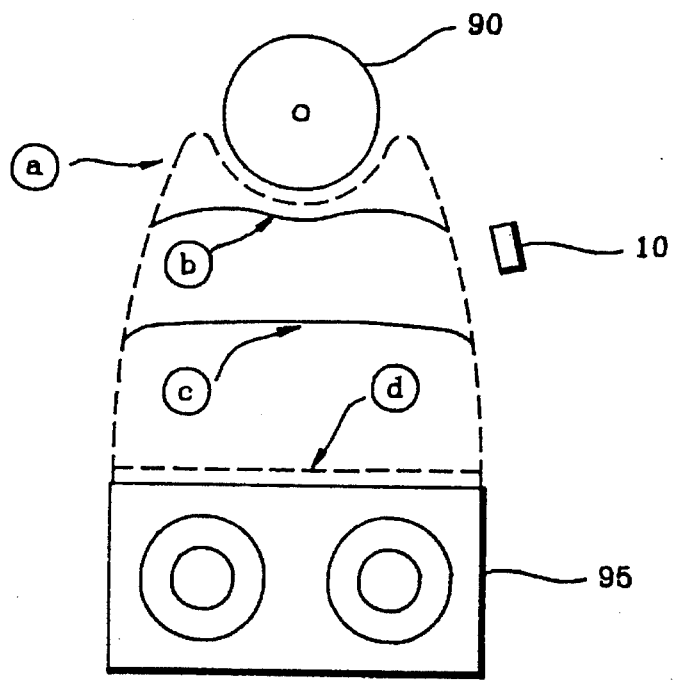
FIG. 3 illustrates the positions of a tape.

FIG. 3 illustrates the position of the tape. The A/C head 10 is disposed between a drum 90 and a cassette 95, and (a) though (d) represent a range of tape positions between fully loaded and unloaded.

Figure 4A:
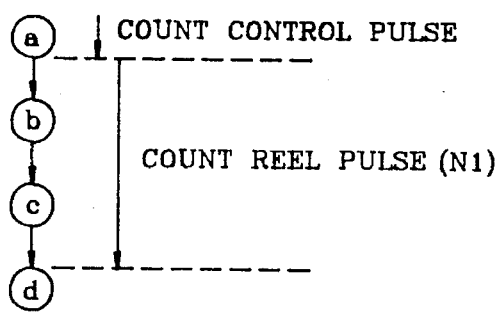
FIGS. 4A and 4B are directed to a power turning-off operation and a power turning-on operation, respectively.
Figure 4B:
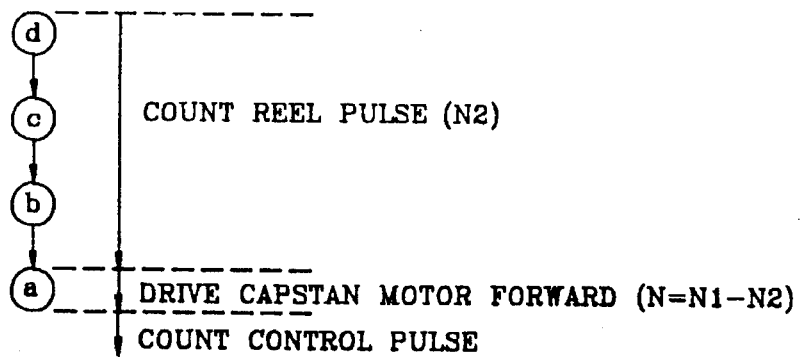

FIG. 4 is a timing chart showing the operation according to the present invention, in which FIG. 4A illustrates the running of the tape during power turning-off, and FIG. 4B illustrates the running of the tape during power turning-on.

Figure 5A:
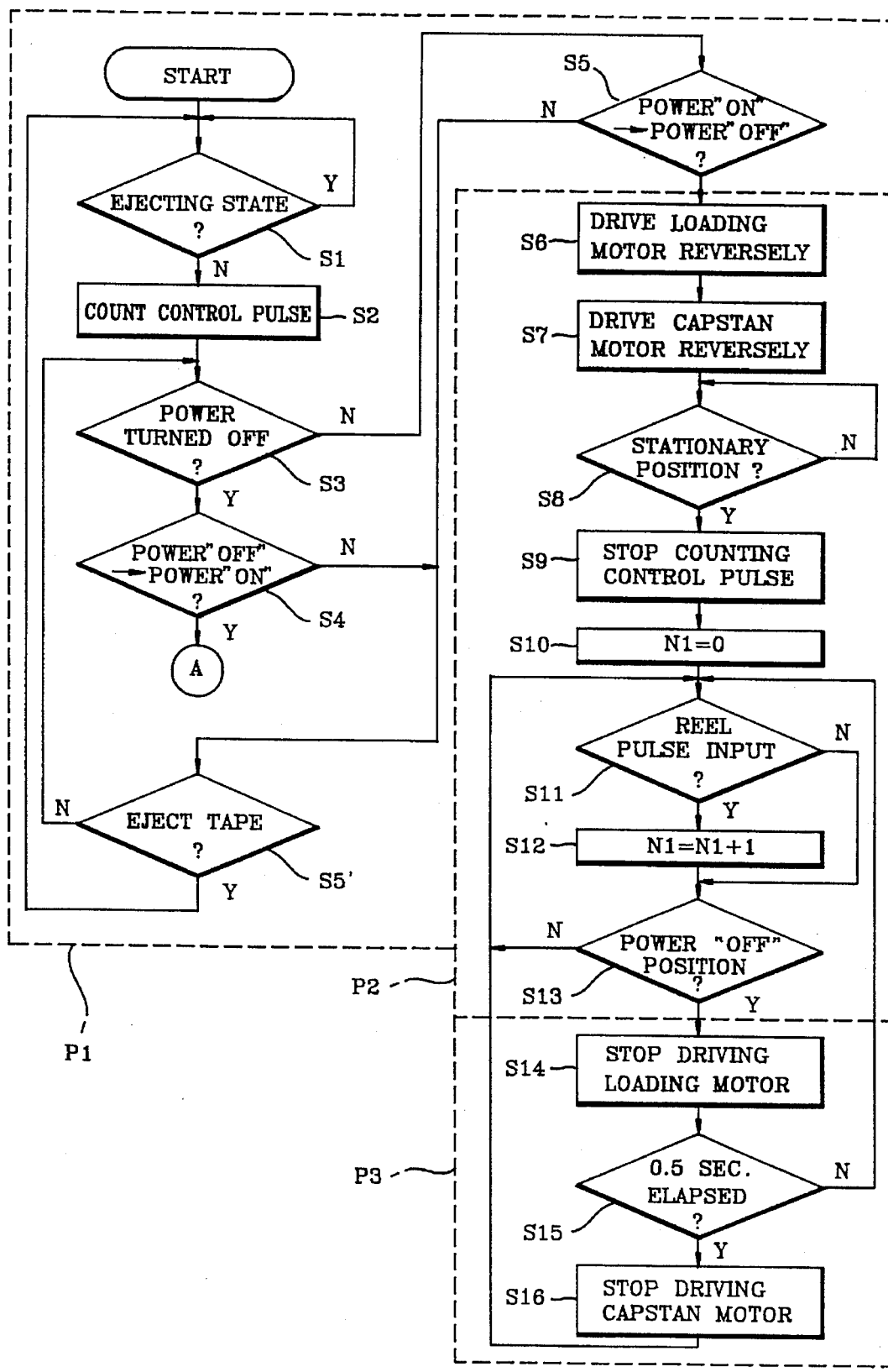
FIGS. 5A and 5B collectively Form is a flow chart showing the constitution of a method according to the present invention.
Figure 5B:
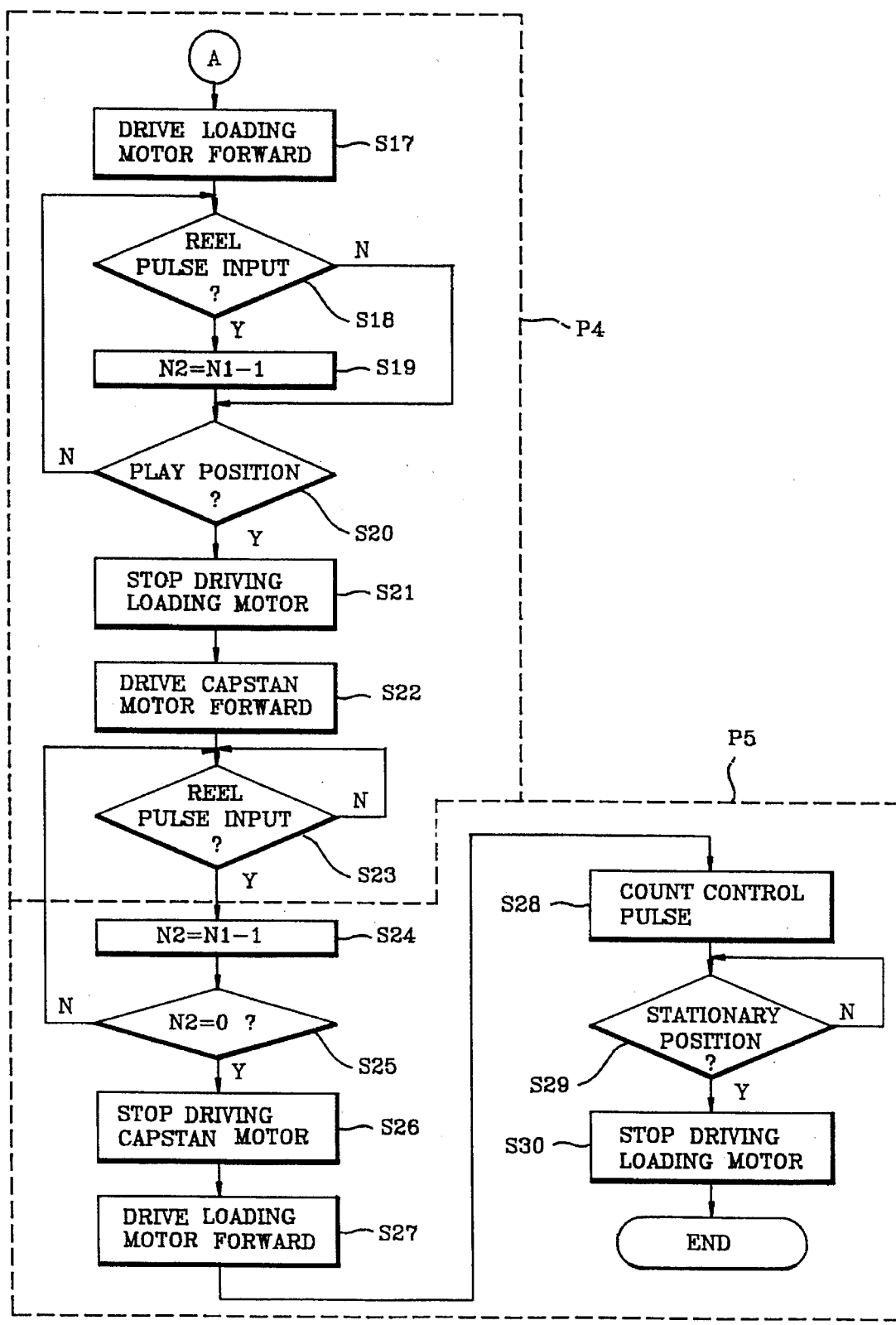

FIGS. 5A and 5B illustrate an internal program of the microcomputer 50, and the program includes: step P1 for discriminating power turning-on and power turning-off; step P2 for, during power turning-off, reversely driving the loading and capstan motors, stopping the counting of control pulses, and after a predetermined time, counting reel pulses; step P3 for stopping the loading motor after counting reel pulses, and stopping the capstan motor after a predetermined time; step P4 for, during power turning-on, forward driving the loading and capstan motors, stopping the counting of control pulses, and resuming the counting of reel pulses; and step P5 for forward driving the capstan motor an amount corresponding to the difference in the reel pulse count value during the power turning-on period and reel pulse count value during the power turning-off period, then stopping the loading motor, and resuming the counting of control pulses.

Step P1 in which power turning-on and off are discriminated includes: a substep S1 for discriminating a tape ejecting state; a substep S2 for counting control pulses if the tape is not ejected; a substep S3 for discriminating as to whether power is being turned off while carrying out the substep S2; a substep S4 for discriminating as to whether power turning-on is being started upon detecting power turning-off at the substep S3; a substep S5 for discriminating as to whether power turning-off is being started; and a substep S5' for determining the tape eject state if power turning-on or off is not detected at the substeps S4 and S5, respectively. The above substeps are implemented in the cited order.

Step P2 which is carried out upon detecting a start of power turning-off at the substep S5 includes: substeps S6 and S7 for reversely driving the loading motor 40 and the capstan motor 30; a substep S8 for determining if the tape is at a stationary position while carrying out the substeps S6 and S7; a substep S9 for stopping the counting of control pulses upon detecting a stationary position; a substep S10 for clearing the reel pulse count value N1 to 0; a substep S11 for determining whether there is an input of reel pulses; a substep S12 for incrementing the reel pulse count value upon detecting an input of reel pulses; and a substep S13 for determining whether the power is turned-off. The above substeps are implemented in the cited order.

Step P3, which is carried out upon detecting a power-off condition at the discriminating substep S13 includes: a substep S14 for stopping the revolution of the loading motor 40; and substeps S15 and S16 for stopping the capstan motor 30 after an elapse of 0.5 seconds. The above substeps are carried out in the cited order.

Step P4, which is carried out upon detecting a shifting from a power turning-off state to a power turning-on state at the substep S4, includes: a substep S17 for forward driving the loading motor 40; substeps S18 and S19 for subtracting the reel pulse input from the count value N1 upon detecting an input of reel pulses; a substep S20 for determining whether the tape is at a play position and for returning the operation to the discriminating substep S18 upon not detecting the play position; a substep 21 for stopping the loading motor 40 upon detecting a play position; a substep S22 for starting the capstan motor 30; and a substep S23 for determining whether there is an input of reel pulses, and repeating the last step until there is an input of reel pulses.

Step P5, which is carried out upon detecting an input of reel pulses at the substep S23, includes: a substep S24 for subtracting the number of the input reel pulses from a value N2 (in which the number of input reel pulses are already subtracted up to the point where the tape arrives at the play position while carrying out step P4); a substep S25 for determining whether the number N2 of the reel pulses is 0 and for returning the operation to the substep S23 upon detecting a value other than 0; substeps S26 and S27 for stopping the capstan motor and forward driving the loading motor upon detecting N2=0; a substep S28 for resuming the counting of control pulses; a substep S29 for determining whether the tape is in a stationary position and repeating the substep S29 upon not detecting a stationary position; and a substep S30 for stopping the loading motor 40 upon detecting a stationary position. The above substeps are carried out in the cited order.

In general, in a VCR as shown in FIG. 3, the position of the tape is shifted in the order of (a)–(b)–(c)–(d) during power turning-off, while it is shifted in the order of (d)–(c)–(b)–(a) during power turning-on. Meanwhile, the A/C head 10, which detects control pulses from the tape, is disposed between the drum 90 and a tape cassette 95, with the result that the A/C head 10 cannot detect control pulses for some positions of the tape.

Figure 1A:
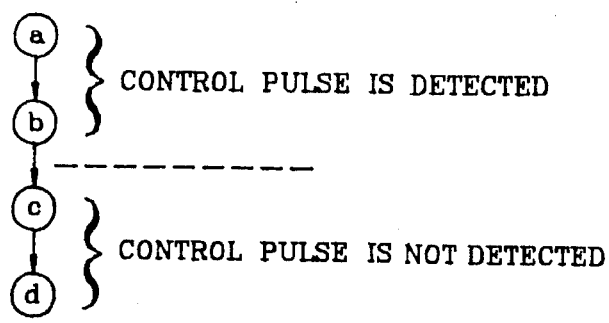
FIGS. 1A and 1B are directed to a power turning-off operation and a power turning-on operation, respectively.
Figure 1B:
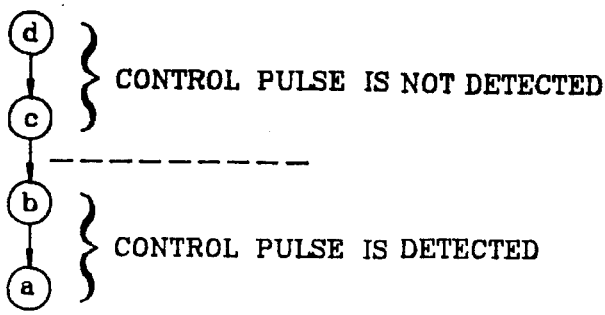

That is, during a power turning-off operation, the capstan motor and the loading motor rotate in the reverse direction, and the tape moves in the order of (a)–(b)–(c)–(d) as shown in FIG. 1A, with the result that, in the prior art, control pulses are not detected in the interval of (c)–(d). During a power turning-on operation, the capstan motor and the loading motor rotate in the forward direction, and the tape moves in the order of (d)–(c)–(b)–(a) as shown in FIG. 1B, with the result that control pulses are not detected through the interval of (d)–(c).

Further, when power is being turned on after turning it off, there occurs a difference between the winding amount and the unwinding amount of the tape in the intervals of (c)–(d) and (d)–(c), respectively, with the result that the counted value is distorted.

According to the present invention, during a power turning-off operation, reel pulses are counted from the end of the position (a) up to position (d), as shown in FIG. 4A, to obtain a counted value N1. During a power turning-on operation, reel pulses are counted up to the end of the interval of (d)–(a) as shown in FIG. 4B to produce another count value N2. Then the position of the tape is adjusted to the same position as that of the power turning-off position by forward driving the capstan motor in accordance with the number of counted reel pulses N, wherein (N=N1–N2). Thus, the count values of control pulses are modified in the above described manner, thereby solving the conventional problem of distortions.

Thus, the number N1 of reel pulses is counted during power turning-off, and the number N2 of reel pulses is counted during power turning-on. Then the tape runs forward by the capstan an additional amount corresponding to a reel count value N, where N is equal to N1–N2, i.e., the count value N1 (which is the count value of power turning-off period) less the count value N2 (which is the count value of power turning-on period). Thereafter, the counting of control pulses is resumed.

The present invention will be described in more detail with reference to FIGS. 5A and 5B.

First, a determination is made as to whether the VCR is in an ejecting state (S1). If it is not in an ejecting state, control pulses are counted (S2). A check is made as to whether power is turned off (S3), and if power has been turned off, a determination is made as to whether power turning-on is being started from a turned-off state (S4). On the other hand, if power has not been turned off (S3), a determination is made as to whether power turning-off is being started from a turned-on state (S5).

If there is no shift of power turning-on or turning-off, a determination is made as to whether the VCR is in a tape ejecting state S5'. If the tape is ejected (the ejecting state), the system continues to check for an end to this state (S1). If the tape is not ejected, the system continues to look for a change in power status (S4 & S5). Meanwhile, if the tape is running, control pulses continue to be counted (S2).

If power turning-off is started from a power turning-on state (that is, if power of the VCR is turned off), the loading motor 40 and the capstan motor 30 are reversely rotated, while the system checks to see whether the tape is at the stationary position (S6, S7 and S8). The stationary position indicates that the tape is positioned at the position (a) in FIG. 3.

When the stationary position arrives, the counting of control pulses is stopped (S9), and the count value N1 of reel pulses is cleared to 0 (S10).

Then reel pulses, which are initialized to zero at S10, are input (S11) and counted to increase the count value (N1) (S12). Each additional pulse adds +1 to the value N1. Then a check is made as to whether a power-off position has been reached (S13). The power-off position indicates that the tape is at the position (d) of FIG. 3, which position is one in which the tape is back in the cassette.

If the power-off position is reached, the loading motor 40 is stopped (S14), and, after an elapse of 0.5 seconds (S15), the capstan motor 30 is stopped (S16). Under this condition, the reason that the capstan motor 30 is driven for 0.5 second more after the stopping of the loading motor 40 is to rewind the tape completely into the cassette 95 from the position (d) of FIG. 3.

That is, if a shift is started from a power-on state to a power-off state, the loading motor 40 and the capstan motor 30 are reversely rotated. Then the loading motor 40 is stopped after counting reel pulses, and then, after elapsing 0.5 seconds, the capstan motor 30 is also stopped, thereby completing the power off operation.

Thereafter, if a shifting is started from a power-off state to a power-on state, the loading motor 40 is forward rotated (S17), and an input of reel pulses is checked (S18). Then the input of reel pulses is subtracted from the count value N1, and a check is made as to whether the tape is in a play position (S19 and S20). For illustration, total count value of reel pulses is designated N2 in FIG. 5B, and thus, the start value at the time of turn on is N2=N1, and thereafter each reel pulse detected decreases the value of N2 by a count of 1. This is shown in S19 as N2=N1−1. When N2 reaches zero, signifying that the reel has turned equal amounts during the turn on and turn off operations (S25), the capstan motor is turned off.

That is, if a shift is made to a power-on state, the loading motor 40 is rotated forward, the input number of reel pulses is subtracted from the previous counted value N1, and then, the play position is checked. The play position indicates that the tape is positioned at the position (a) of FIG. 3.

When the play position arrives, the loading motor 40 is stopped (S21), the capstan motor 30 is forward rotated (S22), and at the same time, a check is made as to whether N2 equals to 0 (S23–S25), after subtracting the input number of reel pulses from the count value N1 up to the play position.

If N2 becomes equal to 0 (N2=0), the capstan motor 30 is stopped, and the loading motor 40 is forward driven, while, at the same time, counting of control pulses is started (S26–S28).

That is, during the normal operation of the VCR, control pulses are counted and displayed. Furthermore, under the normal operation, if a stationary position arrives (S29), the loading motor is stopped (S30), and the operation exits.

According to the present invention, the tape position which has been advancing up to a power turning-on period is regained by counting reel pulses during power turning-on, so that the position of tape should not be distorted during power turning-off or on, but that the tape should be operated at exact positions, thereby compensating distortions.

As described above, a VCR which counts control pulses to show tape position is prevented from being distorted by counting reel pulses. That is, reel pulses are counted from the start of power turning-off to the end of power turning-off, and reel pulses are also counted from the start of power turning-on to the end of power turning-on. Then the tape is to run until there is supplied such a number of reel pulses that is equivalent to the count value of the power turning-off period less the count value of power turning-on period, thereby preventing the distortions during power turning-off and power turning-on.

What is claimed is:

1. In a VCR of the type having a loading motor and a capstan motor for driving a tape, having means for detecting a turning-off operation and for detecting a turning-on operation, and having means for counting control pulses and displaying count values corresponding thereto; a method for correcting distortions in the count values due to the turning-on and turning-off operation, comprising the steps of:

(1) in the turning-off operation:
      (a) upon detecting a start of the turning-off operation, driving the loading motor and the capstan motor in respective reverse directions;
      (b) upon detecting the start of the turning-off operation, inhibiting the counting of the control pulses and, instead, counting reel pulses;
      (c) ceasing to drive the loading motor and continuing to drive the capstan motor for a brief period thereafter; and (2) in the turning-on operation:
      (a) upon detecting a start of the turning-on operation, driving the loading motor and the capstan motor in respective forward directions;
      (b) upon detecting the start of the turning-on operation, inhibiting the counting of the control pulses and, instead, counting reel pulses;
      (c) after the tape reaches a position permitting a play mode of operation, ceasing to drive the loading motor, and continuing to drive the capstan motor until a total number of reel pulses counted during the turning-on operation equals a total number of reel pulses counted during a last preceding turning-off operation.

2. In a VCR of the type having a loading motor and a capstan motor for driving a tape, having means for detecting a turning-off operation and for detecting a turning-on operation, and having means for counting control pulses and displaying count values corresponding thereto; a method for correcting distortions in the count values due to the turning-on and turning-off operation, comprising the steps of:

(1) in the turning-off operation:
      (a) upon detecting a start of the turning-off operation, driving the loading motor and the capstan motor in respective reverse directions;
      (b) inhibiting the counting of the control pulses and, instead, counting reel pulses;
      (c) ceasing to drive the loading motor;
      (d) ceasing to drive the capstan motor; and (2) in the turning-on operation:
- (a) upon detecting a start of the turning-on operation, driving the loading motor in a respective forward direction while inhibiting the counting of the control pulses and, instead, counting reel pulses;
- (b) ceasing to drive the loading motor;
- (c) driving the capstan motor forward until a total number of reel pulses counted during the turning-on operation equals a total number of reel pulses counted during a last preceding turning-off operation; and
- (d) resuming the counting of the control pulses.

3. The method according to claim 2, wherein, in the turning-off operation, said counting of the control pulses is inhibited once the tape is disposed in a position permitting a stationary mode of operation.

4. The method according to claim 2, wherein, in the turning-off operation, said counting of the reel pulses continues until the tape is disposed in a power-off position.

5. The method according to claim 2, wherein, in the turning-off operation, the capstan motor is driven for a brief period after ceasing to drive the loading motor.

6. The method according to claim 5, wherein, in the turning-off operation, the brief period is substantially 0.5 seconds.

7. The method according to claim 5, wherein the tape is housed in a cassette, and, in the turning-off operation, said driving of the capstan motor for the brief period disposes the tape completely within the cassette.

8. The method according to claim 2, wherein, in the turning-on operation, said counting of the reel pulses continues until the tape is disposed in a position permitting a play mode of operation.

9. The method according to claims 2, wherein, in the turning-on operation, said counting of the reel pulses is performed by decrementing the total number of reel pulses counted during the last preceding turning-off operation.

10. The method according to claim 2, wherein, in the turning-on operation, said ceasing to drive the loading motor occurs when the tape is disposed in a position permitting a play mode of operation.

11. The method according to claim 9, wherein, in the turning-on operation, said forward driving of the capstan motor is performed while further decrementing the total number of reel pulses counted during the last preceding turning-off operation; and said forward driving of the capstan motor ceases when the decremented total number of reel pulses attains the value zero.

12. The method according to claims 2, wherein, in the turning-on operation, said resuming the counting of the control pulses occurs when the total number of reel pulses counted during the turning-on operation equals the total number of reel pulses counted during the last preceding turning-off operation.

13. The method according to claim 2, further comprising:
- in the turning-on operation, driving the loading motor forward upon said resuming of the counting of the control pulses; and ceasing said forward driving of the loading motor when the tape is disposed in a position corresponding to a stationary mode of operation.

* * * * *